United States Patent [19]

Case, Jr. et al.

[11] Patent Number: 4,996,693
[45] Date of Patent: Feb. 26, 1991

[54] INPUT/OUTPUT PORTS FOR A LASING MEDIUM

[75] Inventors: Allen W. Case, Jr., Amsterdam; Carl M. Penney, Saratoga Springs, both of N.Y.

[73] Assignee: General Electric Company, Schenectady, N.Y.

[21] Appl. No.: 376,096

[22] Filed: Jul. 6, 1989

[51] Int. Cl.$^5$ ............................................. H01S 3/06
[52] U.S. Cl. ...................................... 372/66; 372/92; 372/93; 372/108
[58] Field of Search .................. 372/66, 92, 100, 108, 372/93, 98

[56] References Cited

U.S. PATENT DOCUMENTS

| | | | |
|---|---|---|---|
| 3,140,451 | 7/1964 | Fox | 372/66 |
| 3,222,615 | 12/1965 | Holly | 372/66 |
| 4,740,983 | 4/1988 | Azad | 372/66 |

Primary Examiner—Leon Scott, Jr.
Attorney, Agent, or Firm—John S. Beulick; James C. Davis, Jr.; Paul R. Webb, II

[57] ABSTRACT

An input/output port for a lasing medium to minimize wavefront distortion of a coherent light beam is described. The input/output port includes an end surface integral the medium and a first port surface integral the end surface. The first port surface is substantially perpendicular to a plane normal to the longitudinal axis extending through the medium so that each ray of a beam of coherent electromagnetic radiation lying in a plane of a thickness of the beam may impinge on the port surface at a substantially equal angle with respect to reference planes normal to the port surface at the points of impingement.

20 Claims, 5 Drawing Sheets

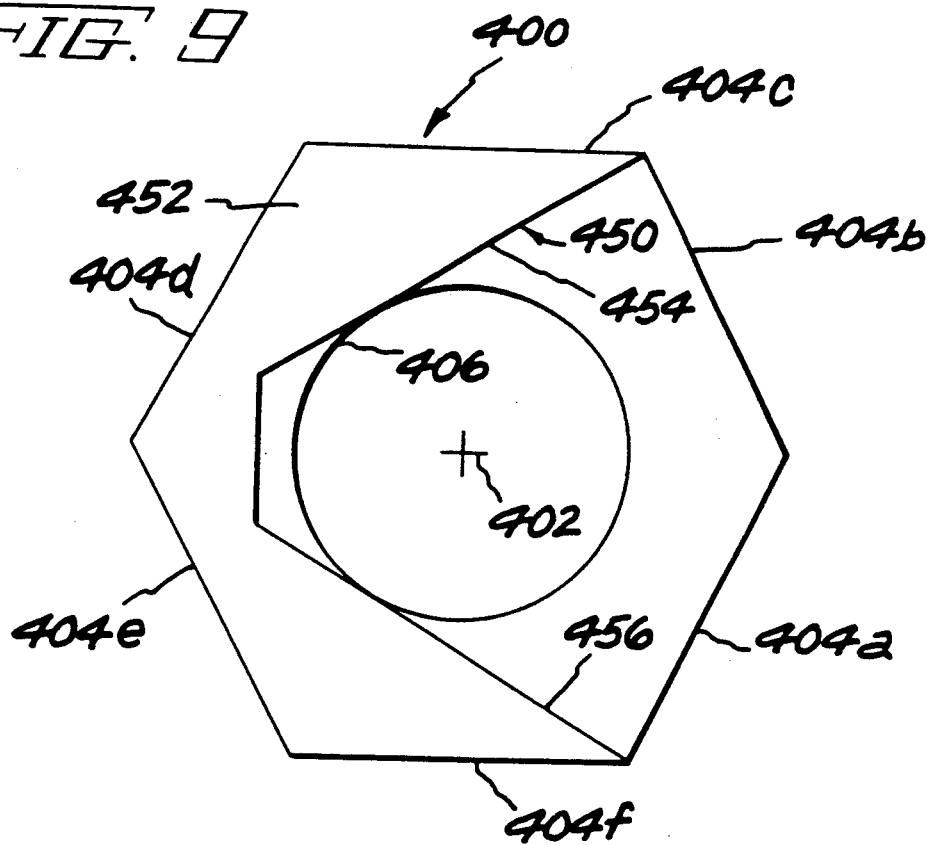
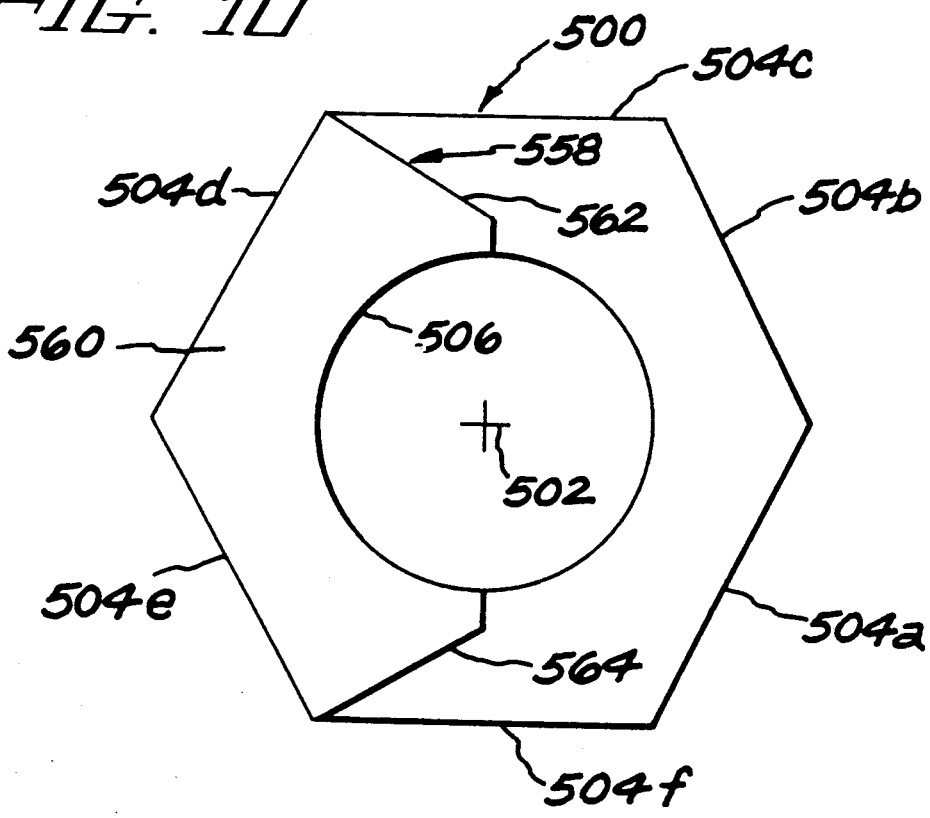

INPUT/OUTPUT PORTS FOR A LASING MEDIUM

The present invention is related generally to lasers and more specifically to input/output ports for introducing/extracting a coherent beam from a lasing medium.

BACKGROUND OF THE INVENTION

A laser beam source for generating and/or emitting coherent electromagnetic radiation generally includes a lasing medium constructed from a homogeneous body of solid state lasing material such as yttrium aluminum garnet (YAG) doped with neodymium (Ng:YAG) or neodymium doped glass. Known lasing mediums have many configurations such as a cylindrical configuration utilized in rod lasers. With rod lasers, however, during operation, thermal gradients are formed within the medium. The thermal gradients distort coherent light wavefronts transmitted therethrough and this distortion adversely affects the operation efficiency and quality of the beam.

Improvements have been made in medium configuration to minimize wavefront distortion. One example of an improved lasing medium configuration is disclosed in commonly assigned U.S. Pat. No. 4,740,983, entitled "Laser Apparatus for Minimizing Wavefront Distortion" to Azad, the disclosure of which is incorporated in its entirety herein by reference. The lasing medium of the laser device disclosed in the Azad patent generally has end surfaces, a hexagonal cross section and an interior surface with a circular cross section coaxial with a longitudinal axis of the medium. The interior surface of the Azad device defines an interior space for receiving a radiation pumping source, and the external side surfaces of the lasing medium are surrounded with a circumferential reflector. A prism is disposed on a side surface substantially adjacent each end surface of the medium for the introduction/extraction of coherent radiation. When operating the Azad device as an amplifier, the pumping source emits radiation which excites atoms of the lasing medium. Fluid coolant is flowed over the internal and side surfaces of the medium and a coherent light beam is introduced through one prism. The beam passes through the medium following a helical course and the beam totally internally reflects off the side surfaces of the medium. An amplified beam exits the medium through the other prism. Until now, utilizing prisms for the introduction/extraction of the beam was the preferred construction.

Introduction/extraction of the beam through the prisms, however, causes thermal gradients to be formed within the lasing medium during operation. The thermal gradients are caused by non-symmetric flashlamp pumping and liquid/gas cooling geometries due to the presence of the prisms. Specifically, the pumping lamp emits electromagnetic radiation which impinges uniformly over the entire area of the interior surface of the lasing medium. The electromagnetic radiation from the pumping source causes excitation of atoms within the lasing medium, and this excitation will be uniform throughout the medium except for at the location of the prisms. The non-uniform excitation at the prisms causes distortion of the beam. The prisms also cause non-uniform cooling geometries because the prisms alter the otherwise uniform geometry of the medium. Although the distortion of the beam wavefront due to the prisms has been described with reference to the medium operating as an amplifier, distortion of the beam wavefront also occurs when the medium operates in other modes, such as an oscillator.

OBJECTS OF THE INVENTION

It is therefore an object of the present invention to provide input/output ports for a lasing medium which overcome these and other shortcomings and disadvantages of the known art.

Another object of the present invention is to provide input/output ports for a lasing medium which minimize thermal gradients within the medium and minimize distortion of a coherent beam passing therethrough.

Still another object of the present invention is to provide input/output ports for a lasing medium which provide more symmetric flashlamp pumping and cooling geometries.

SUMMARY OF THE INVENTION

The present invention is a construction for an input-/output port of a lasing medium and includes an end surface integral with the medium and a port surface integral with the end surface. The port surface is substantially perpendicular to a first plane normal to the longitudinal axis of the medium, and the port surface is disposed so that each ray of a beam may impinge thereon at a same angle with respect to a plane normal to the port surface at the locations of impingement.

The present input/output port does not substantially affect the mechanical symmetry of the medium, and therefore, the present port provides more symmetric flashlamp pumping and cooling geometries in the lasing medium. The improved thermal and mechanical symmetry decreases distortion of the beam wavefront and improves the operating efficiency and the quality of the beam.

BRIEF DESCRIPTION OF THE DRAWINGS

FIG. 9 is an end view of an input/output port in accordance with still yet another embodiment of the present invention; and FIG. 10 is an end view of an input/output port in accordance with another embodiment of the present invention.

DETAILED DESCRIPTION OF THE INVENTION

Figure 1:
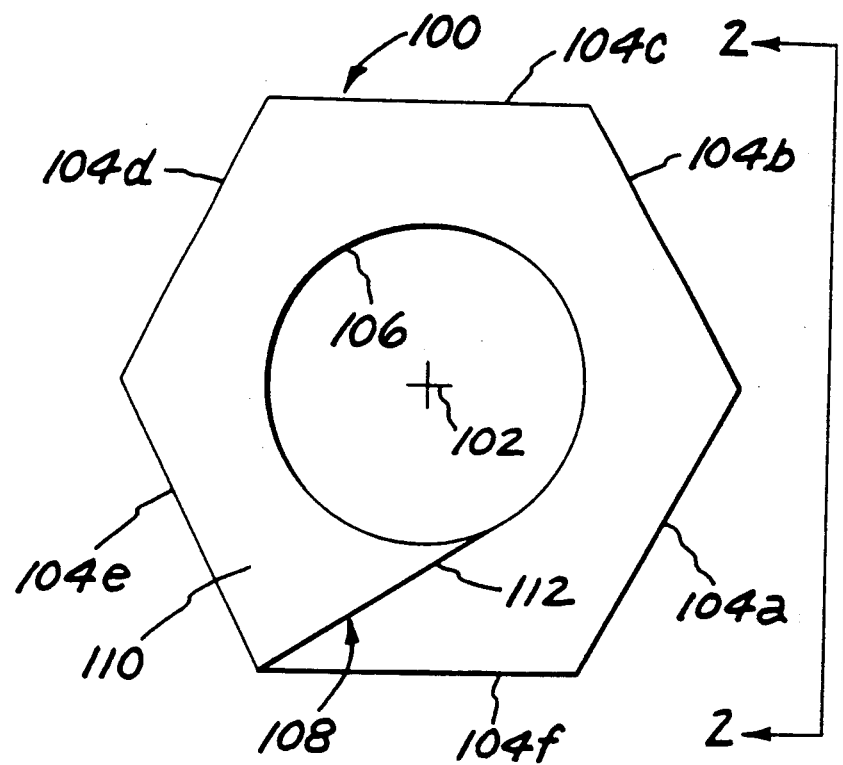
FIG. 1 is an end view of the input end of a lasing medium including an input/output port in accordance with the preferred embodiment of the present invention.

As illustrated in FIG. 1, a lasing medium 100 has a regular polygonal cross section in the form of a hexagon perpendicular to a longitudinal axis 102. Lasing medium 100 includes optically plane external faces 104a–f and is similar to the medium disclosed in the previously identified Azad patent. Although the present input/output ports are described with reference to medium 100, the input/output ports can be utilized with various mediums of various configurations. Lasing medium 100 may comprise a homogeneous body of solid state lasing material such as yttrium aluminum garnet (YAG) doped with neodymium (Ng:YAG) or neodymium doped glass. Medium 100 has an interior surface 106 with a circular cross section coaxial with longitudinal axis 102 of the medium. Pumping means, such as a flash-type lamp, may be positioned in the interior space defined by internal surface 106. The lamp emits optical electromagnetic radiation at wavelengths suitable for exciting the atoms of lasing medium 100 to a metastable state. The pumping means should be coextensive with medium 100 so that radiation emitted by the lamp impinges uniformly over the entire area of interior surface 106.

Figure 2:
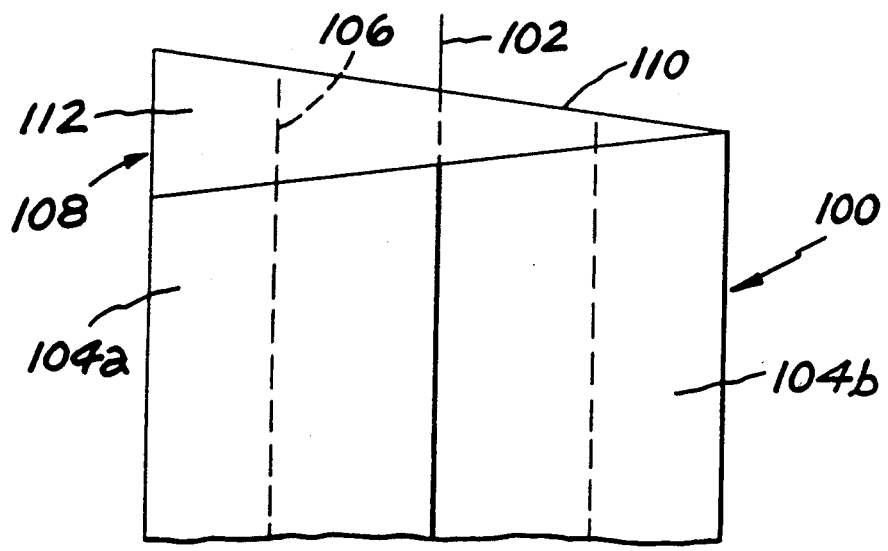
FIG. 2 is a side view of the input/output port and a portion of the lasing medium of FIG. 1.

In accordance with the preferred embodiment of the present invention, and with reference to FIG. 1, an input port 108 includes a first end surface 110 integral with the medium. The first end surface is helical-shaped as best shown in FIG. 2. Input port 108 also includes an input port surface 112 for the introduction of a beam of coherent electromagnetic radiation. Input port surface 112 is integral with first end surface 110 and input port surface 112 is optically planar and substantially perpendicular to a first plane normal to longitudinal axis 102. It is not necessary that port surface 112 be substantially perpendicular and surface 112 only needs to be oriented so that coherent electromagnetic radiation directed through the surface totally internally reflects off of each face 104 and follows a helical course between each end surface.

Figure 3:
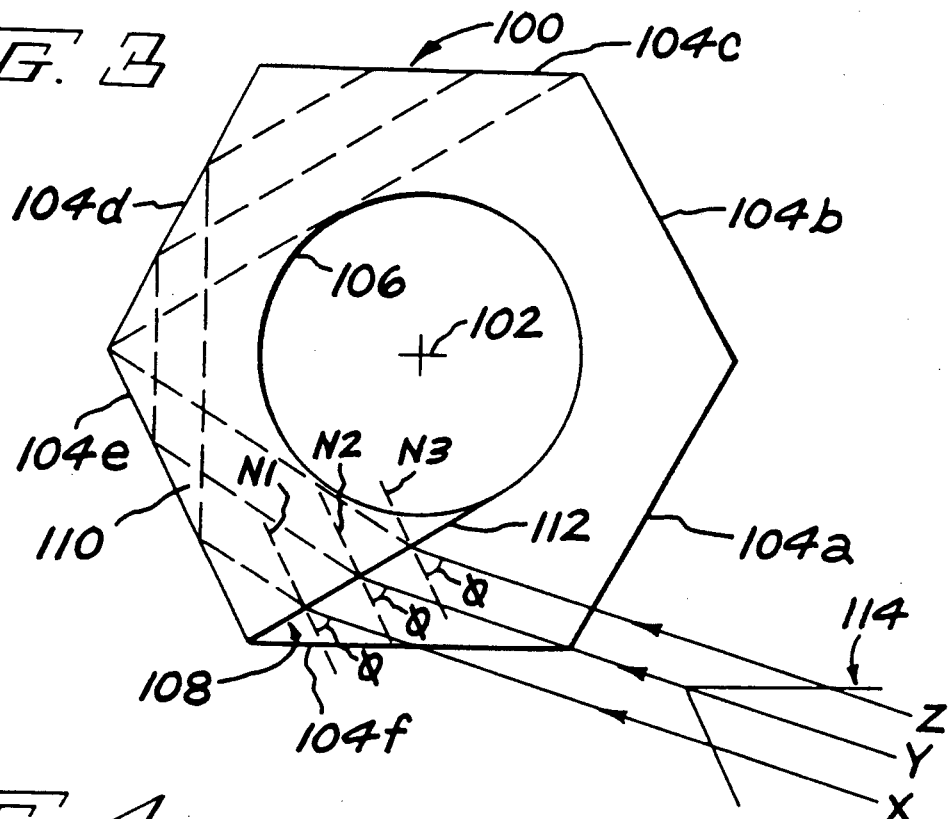
FIG. 3 is a top view illustrating a coherent light wavefront entering the lasing medium of FIG. 1.

In operation, the pumping means is activated to excite the atoms of a lasing medium 100 to a metastable state. Then, as shown in FIG. 3, a beam 114 of coherent radiation is applied to input port 108 at input port surface 112. The beam is applied so that each ray x, y and z impinges upon input port surface 112 at a substantially equal angle $\phi$ with respect to planes N1, N2 and N3, respectively, normal to input port surface 112 at the points of impingement. By applying the beam to the port surface in this manner, wavefront distortion is further minimized because any refraction effect that the port surface has on the beam will be uniformly applied to each ray of the beam. The rays then follow a helical course, as partially shown, by totally internally reflecting off each external face 104a–f of medium 100.

Figure 4:
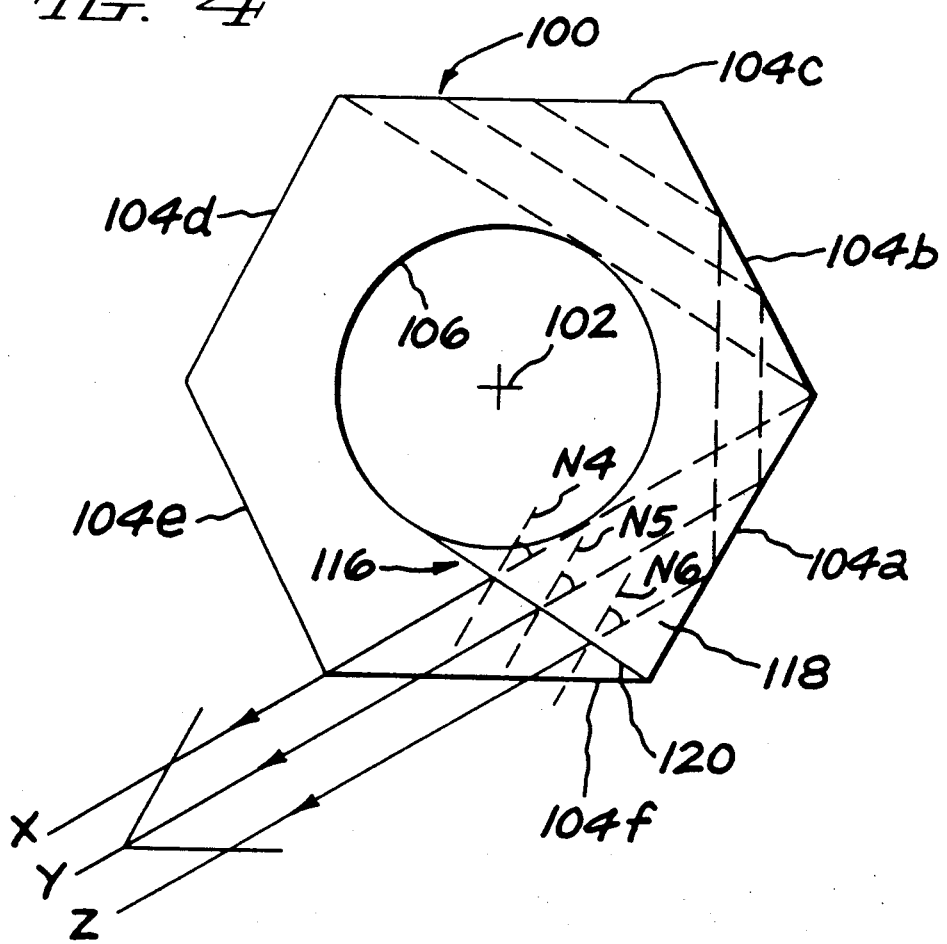
FIG. 4 is an end view of the output end of the lasing medium of FIG. 1 and illustrates a coherent light wavefront exiting the medium.

As shown in FIG. 4, beam 114 exits the medium through an output port 116. Output port 116 includes a second end surface 118 integral with medium 100. An output port surface 120 is integral with the second end surface. The output port is substantially identical to the previously described input port. Each ray x, y and z of the beam impinges upon output port surface 120 at a substantially equal angle with respect to planes N4, N5 and N6, respectively, normal to output port surface 120 at the points of impingement. The rays lying in a plane of the thickness of the beam will traverse substantially the same optical path length through the medium if the beam is introduced and extracted from the medium as described above thereby reducing wavefront distortion of the beam.

Figure 5:
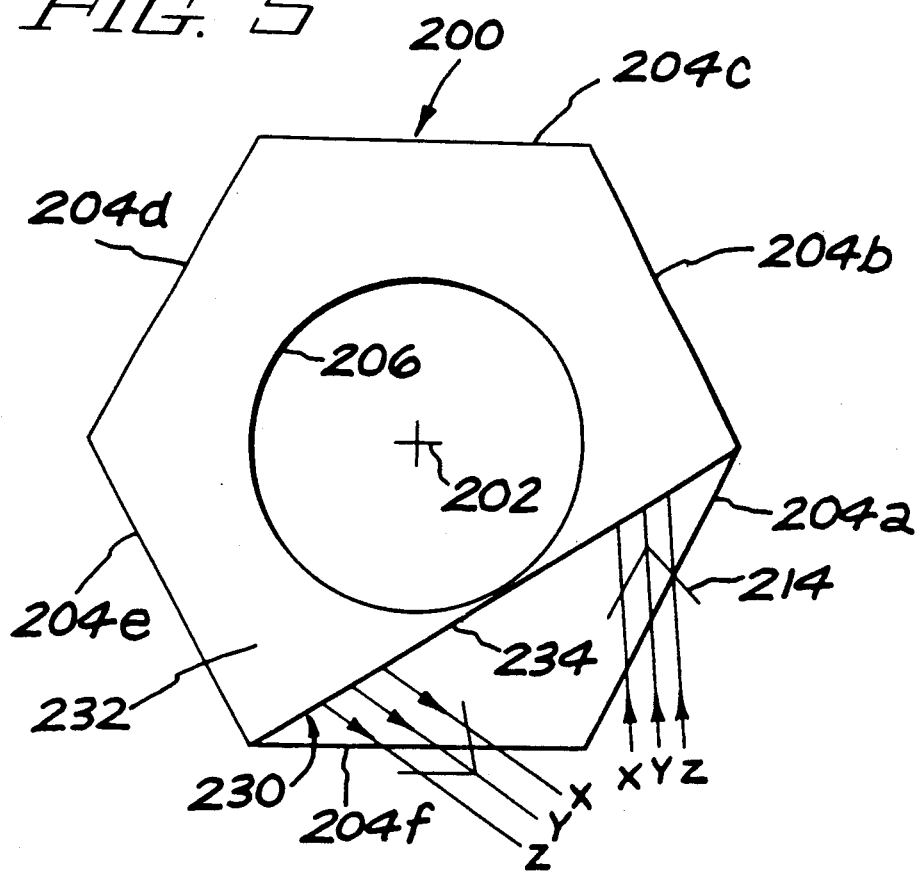
FIG. 5 is an end view of the input/output end of a lasing medium including an input/output port in accordance with another embodiment of the present invention.
Figure 6:
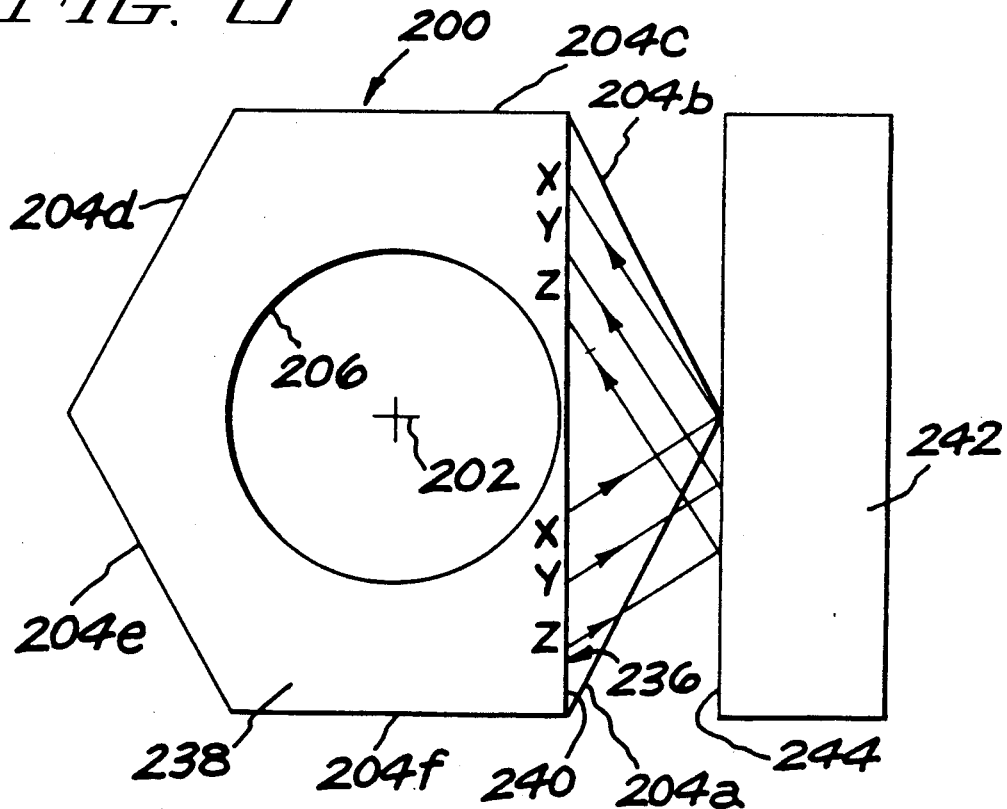
FIG. 6 is an end view of the reflection end of the lasing medium of FIG. 5.

FIG. 5 illustrates another lasing medium 200 including a first input/output port 230 in accordance with the present invention. Components shown in FIG. 5 have the same last two digits as the corresponding component, if any, shown in FIGS. 1–4. First port 230 illustrated in FIG. 5 includes a first end surface 232 which is substantially planar rather than helical-shaped. First end surface 232 is integral with lasing medium 200 and first port surface 234 is integral with the first end surface. First port 230, as hereinafter described, serves as the input/output port for both introduction and extraction of electromagnetic radiation. As shown in FIG. 6, medium 200 includes a second port 236, sometimes referred to herein as a reflection port. Second port 236 includes a second end surface 238 integral with the medium opposite first port 230. A second port surface 240 is integral with second end surface 238. A mirror 242 including a reflective surface 244 is aligned substantially parallel with second port surface 240.

In operation, and by way of example, beam 214 of electromagnetic radiation is introduced into medium 200 through first port surface 234 as shown in FIG. 5. The beam then follows a first helical course through the medium and exits the medium through second port surface 240, as shown in FIG. 6. The beam is reflected back into medium 200 by mirror 242. The beam then follows a second helical course through the medium and is extracted through first port surface 234, as shown in FIG. 5. The beam passes through nearly 100% of the pumped volume of medium 200, and therefore, the medium will amplify the beam to a high magnitude and very little energy will be wasted, i.e. most all the excited atoms within the medium will impart energy into the beam. Also, each ray x, y and z of the beam impinges upon the port surfaces at a substantially equal angle with respect to planes normal to the port surface thereby further reducing wavefront distortion.

Figure 7:
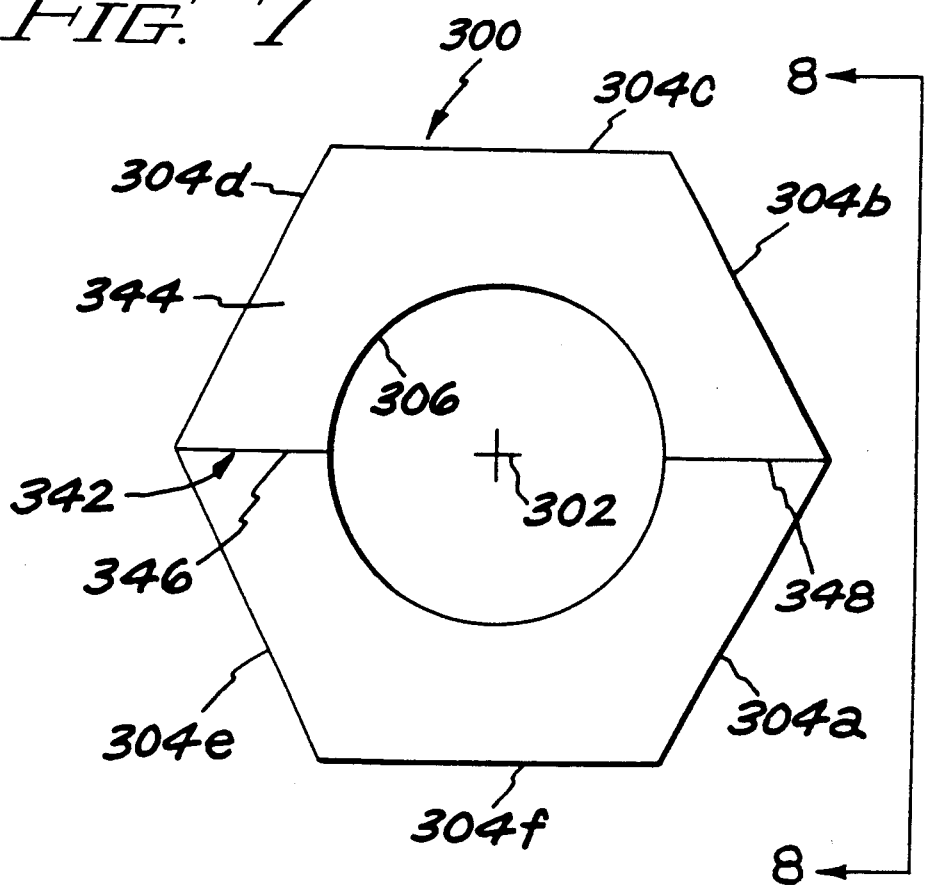
FIG. 7 is an end view of an input/output part in accordance with yet another embodiment of the present invention.
Figure 8:
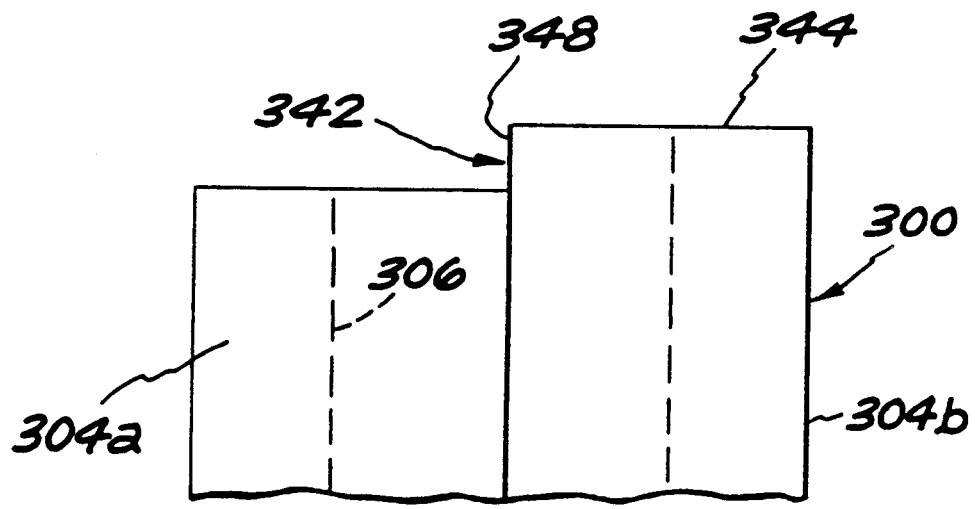
FIG. 8 is a side view of the input/output port and a portion of the lasing medium of FIG. 7.

FIGS. 7 and 8 illustrate yet another embodiment of an input/output port 342 in accordance with the present invention. Components shown in FIGS. 7-8 have the same last two digits as the corresponding component, if any, shown in FIGS. 1–6. Port 342 includes a substantially planar end surface 344 integral with medium 300. The end surface includes first and second spaced port surfaces 346 and 348 for the introduction/extraction of a beam. Operation of embodiment port 342 is substantially similar to operation of the ports previously described herein. Further, a light beam may be introduced and/or extracted from either port surface, and the beam may be introduced/extracted so that each ray of the beam impinges upon the port surface at a substantially equal angle with respect to planes normal to the surface.

FIGS. 9 and 10 illustrate further embodiments of input/output ports in accordance with the present invention. As in the other drawings, components shown in FIGS. 9–10 have the same last two digits as the corresponding component, if any, shown in FIGS. 1–8. Port 450 shown in FIG. 9 includes a substantially planar end surface 452 integral with medium 400. The port further includes first and second port surfaces 454 and 456, respectively, integral with the end surface for the introduction/extraction of electromagnetic radiation into the medium. A light beam may be introduced and/or extracted from either port surface.

FIG. 10 illustrates an input/output port 558 in accordance with the present invention and includes a substantially planar end surface integral with medium 500. First and second port surfaces 562 and 564, respectively, are integral with end surface 560. A light beam may be introduced and/or extracted from either port surface.

Although the present input/output ports have been described with reference to a medium having a six-sided regular polygon configuration, the present input/output ports could be utilized with many other configurations. Further, optical pumping and cooling symmetry is better achieved with the present input/output ports because the mechanical symmetry of the medium is not substantially affected by the ports, and a beam may be introduced and/or extracted from the medium through the port without disturbing the thermal symmetry of the medium. Also, uniform excitation of the medium is facilitated thereby providing more symmetric cooling geometry. The present input/output ports therefore increase the operation efficiency and the quality of the beam.

While embodiments have been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A port for a solid state lasing medium, the medium having a longitudinal axis, said port comprising:
   an end surface integral said medium;
   a first port surface integral said end surface, said first port surface being optically planar and substantially perpendicular to a first plane normal to said longitudinal axis;
   whereby each ray of a beam of electromagnetic radiation impinges on said first port surface at substantially equal angles with respect to said first port surface and whereby said port provides more symmetric pumping and cooling geometries thereby improving thermal and mechanical symmetry of the medium.

2. A port in accordance with claim 1 wherein said end surface has a helical-shape configuration.

3. A port in accordance with claim 1 wherein said end surface is substantially planar.

4. A port in accordance with claim 1 further comprising a second port surface integral said end surface, said second port surface being optically planar and substantially perpendicular to said first plane normal to said longitudinal axis whereby each ray of a beam of electromagnetic radiation may impinge on said second port surface at substantially equal angles with respect to said second port surface.

5. A port in accordance with claim 4 wherein the beam of electromagnetic radiation is introduced through said first port surface and the beam is extracted through said second port surface.

6. A solid state lasing medium, comprising:
   a first end including a first end surface;
   a second end including a second end surface;
   said lasing medium having a longitudinal axis extending between said first and second ends;
   a first port surface integral said first end surface, said first port surface being substantially perpendicular to a plane normal to said longitudinal axis; and
   a second port surface integral said second end surface, said second port surface being substantially perpendicular to the plane normal to said longitudinal axis;
   said first and second port surfaces providing more symmetric pumping and cooling geometries thereby improving thermal and mechanical symmetry of the medium.

7. A lasing medium in accordance with claim 6 wherein said lasing medium has regular polygon cross section perpendicular to said longitudinal axis.

8. A lasing medium in accordance with claim 7 wherein said polygonal cross section is hexagonal.

9. A lasing medium in accordance with claim 6 wherein said medium is composed substantially of neodymium:yttrium aluminum garnet.

10. A lasing medium in accordance with claim 6 wherein said medium is composed substantially of neodymium doped glass.

11. A lasing medium in accordance with claim 6 wherein the rays of a beam of electromagnetic radiation lying in a plane of a thickness of said beam traverse substantially the same optical path length through said medium.

12. A lasing medium in accordance with claim 6 wherein said first and second end surfaces have a helical-shape configuration and said lasing medium has a regular polygon cross section perpendicular to said longitudinal axis.

13. A lasing medium in accordance with claim 12 wherein said regular polygonal cross section is hexagonal.

14. A solid state lasing medium, comprising:
   a first end including a first end surface;
   a second end including a second end surface;
   said lasing medium having a longitudinal axis extending between said first and second ends and a regular polygon cross section perpendicular to said longitudinal axis;
   optically plane external faces extending between said first and second ends and corresponding to the respective sides of said polygonal cross section;
   a first port surface integral said first end surface;
   a second port surface integral said second end surface; so that electromagnetic radiation directed through one of the port surfaces and through said lasing medium totally internally reflects off of each said external face and follows a helical course between said first and second ends and said first and second port surfaces providing more symmetric pumping and cooling geometries thereby improving thermal and mechanical symmetry of the medium.

15. A lasing medium in accordance with claim 14 wherein said first and second port surfaces are disposed at selected angles relative to said longitudinal axis.

16. A lasing medium in accordance with claim 14 wherein said lasing medium is composed substantially of neodymium:yttrium aluminum garnet.

17. A lasing medium in accordance with claim 14 wherein said first and second port surfaces are optically planar and substantially perpendicular to a first plane normal to said longitudinal axis.

18. A lasing medium in accordance with claim 14 further comprising a means for reflecting a beam extracted from said second port surface back to said second port surface.

19. A lasing medium in accordance with claim 18 wherein said means for reflecting a beam comprises a mirror.

20. A lasing medium in accordance with claim 14 wherein the rays of the beam of electromagnetic radiation lying in a plane of a thickness of the beam all traverse substantially the same optical path length through said lasing medium.

* * * * *